(12) United States Patent
Bermes

(10) Patent No.: US 6,302,280 B1
(45) Date of Patent: Oct. 16, 2001

(54) HOLDER FOR BACKPACK TYPE BLOWER

(75) Inventor: Steven P. Bermes, Grabill, IN (US)

(73) Assignee: Novae Corp., Grabill, IN (US)

( * ) Notice: Subject to any disclaimer, the term of this patent is extended or adjusted under 35 U.S.C. 154(b) by 0 days.

(21) Appl. No.: 09/490,902

(22) Filed: Jan. 25, 2000

(51) Int. Cl.[7] ................................................. A47F 5/00
(52) U.S. Cl. ...................... 211/70.6; 211/175; 211/207; 224/403; 248/218.4; 248/316.4; 248/287.1; 248/297.21
(58) Field of Search .................... 211/70.6, 103, 211/207, 175; 248/297.21, 298.1, 287.1, 316.4, 218.4; 224/402, 403

(56) References Cited

U.S. PATENT DOCUMENTS

| | | | |
|---|---|---|---|
| 524,451 | * | 8/1894 | Ward . |
| 3,250,584 | * | 5/1966 | Tassell . |
| 3,268,196 | * | 8/1966 | Anton . |
| 3,847,489 | * | 11/1974 | Van Riper . |
| 4,467,925 | * | 8/1984 | Ratzloff et al. ..................... 211/70.6 |
| 4,473,176 | | 9/1984 | Harper . |
| 5,645,258 | * | 7/1997 | Flowers ............................ 248/298.1 |
| 5,647,489 | * | 7/1997 | Bellis ................................. 211/70.6 |
| 5,819,933 | | 10/1998 | Hernandez . |
| 5,964,358 | | 10/1999 | Hafendorfer . |
| 6,053,339 | * | 4/2000 | Bellis ................................. 211/70.6 |
| 6,073,781 | * | 6/2000 | Puglisi .............................. 211/70.6 |
| 6,173,842 | * | 1/2001 | Fitzgerald ...................... 211/70.6 X |

OTHER PUBLICATIONS

The Ultimate Organizer Racks advertizement by Green Touch Industries, Inc. (7 pages).
Accessories Catalog—Aug. 1998 by Performance Trailers Inc. (12 pages).
Gear Caddy advertizement by Jungle Jim's Accessory Products, Inc. (2 pages).
Trimmertrap advertizement by Trimmertrap Inc. (6 pages).
Easy Lock Trimmer & Backpack Racks by Performance Trailers, Inc. (1 page).

\* cited by examiner

Primary Examiner—Robert W. Gibson, Jr.
(74) Attorney, Agent, or Firm—George Pappas

(57) ABSTRACT

A blower holder for supporting and storing backpack type blowers on trailers and other vehicles. A shelf is mounted on a support post whereon the blower may rest. A bracket is attached to the post vertically above the shelf and includes hook members at opposing ends. The blower frame or back rest plate sides are selectively received in the hook members thereby sandwiching the blower frame or back rest plate between the hook members. One of the hook members is selectively movable against the blower side and may selectively be affixed along the bracket for sandwiching and retaining the frame or blower back rest plate. A loop is attached to an adjacent post and is adapted to receive and support the blower air pipe.

27 Claims, 4 Drawing Sheets

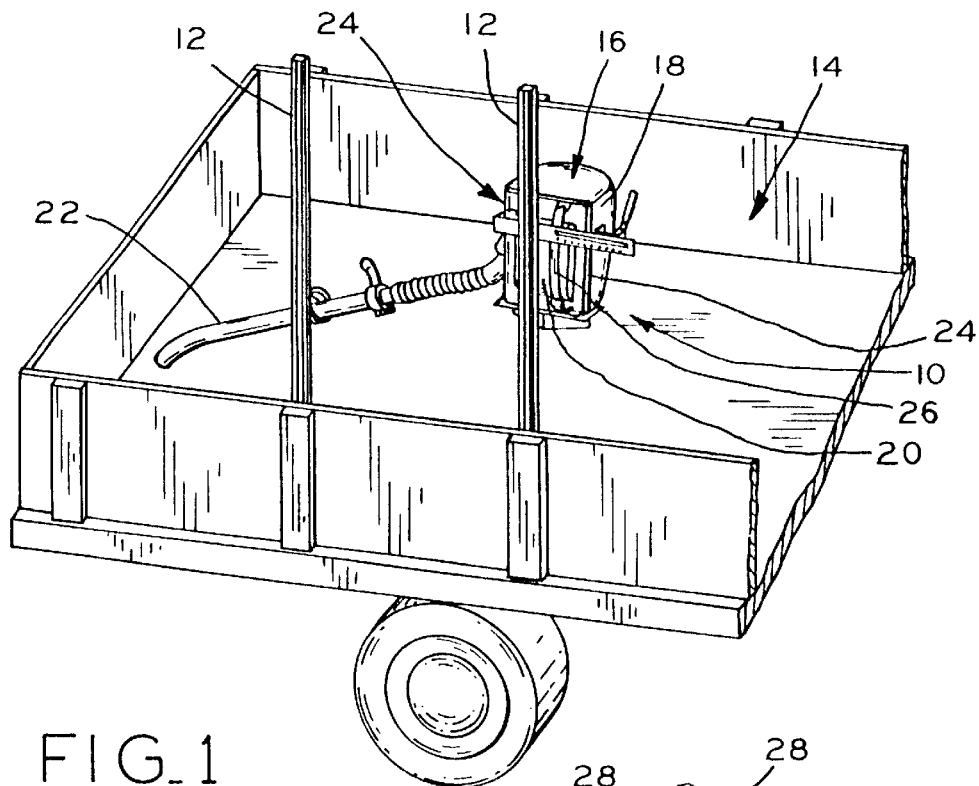
FIG_1
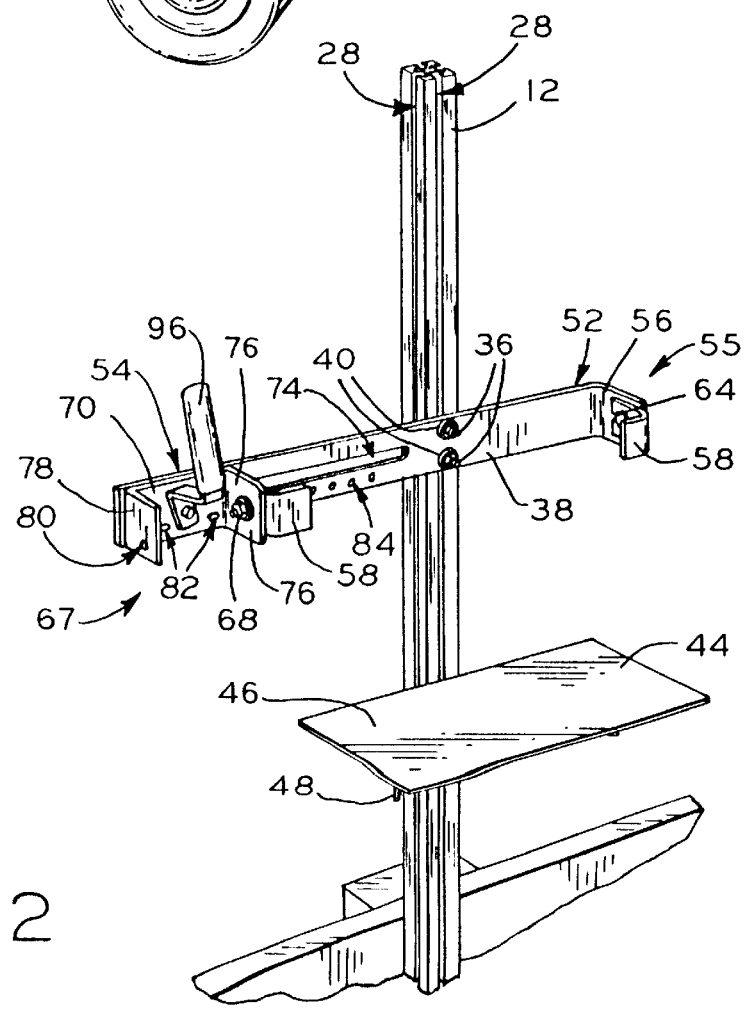
FIG_2

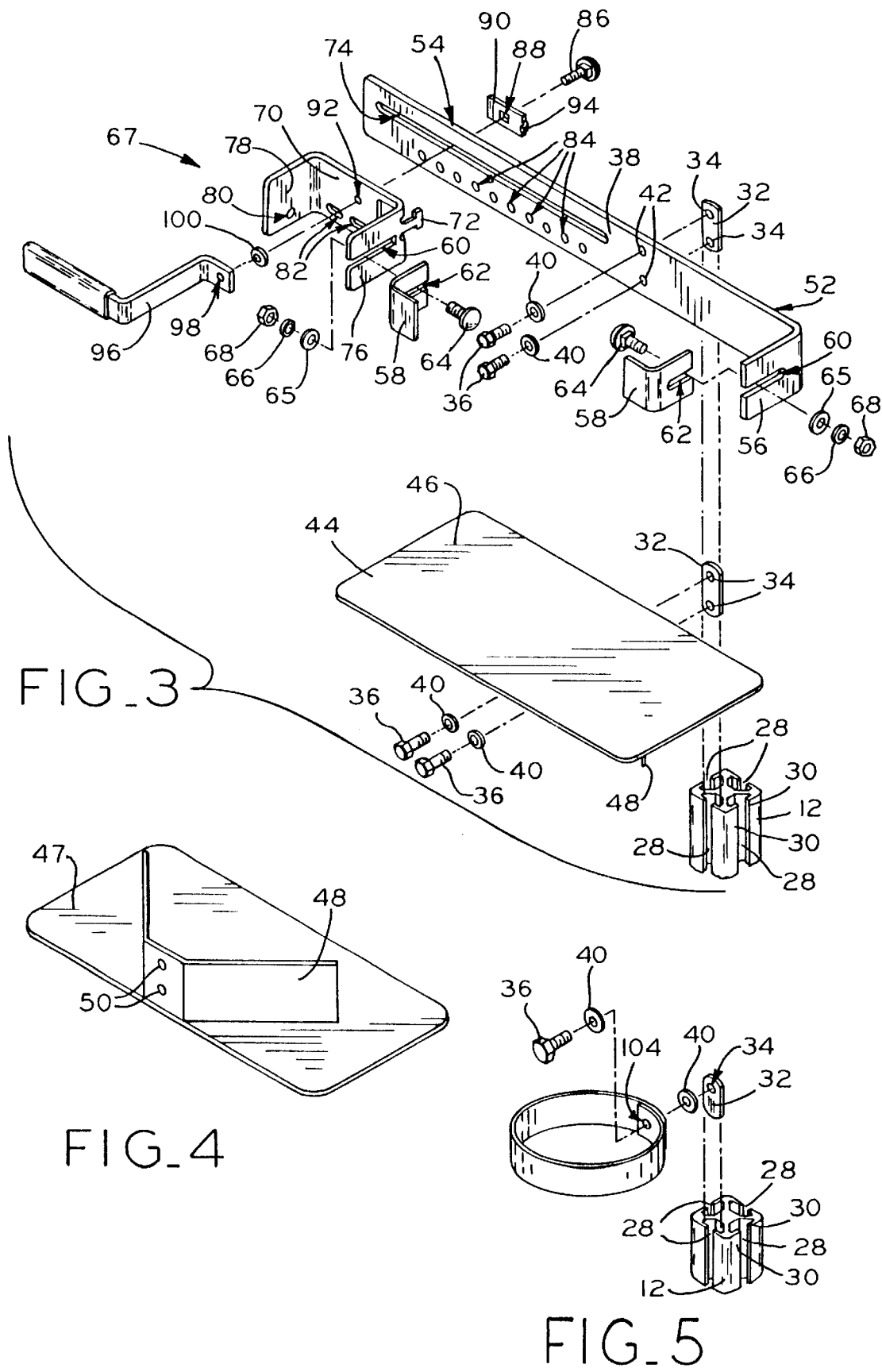

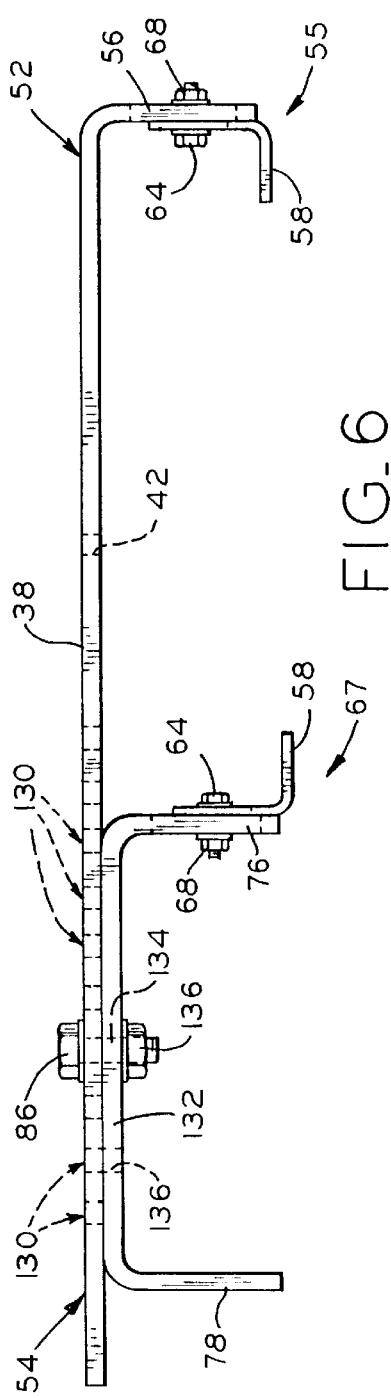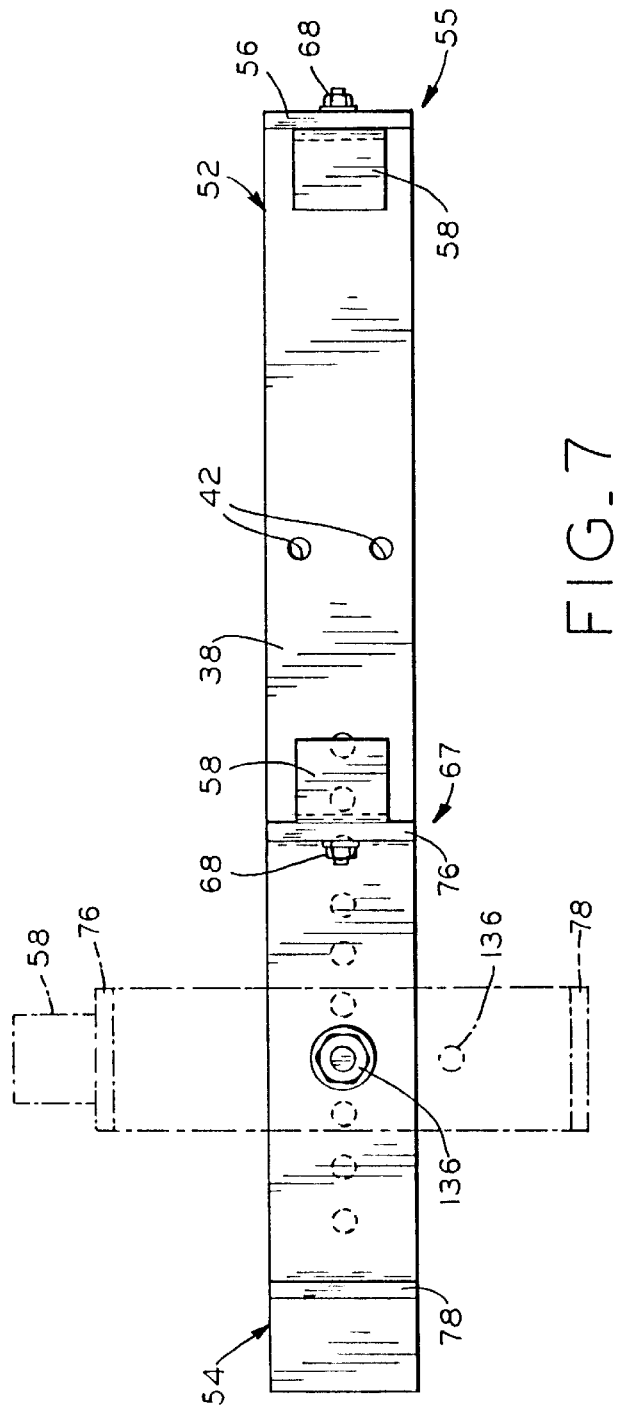

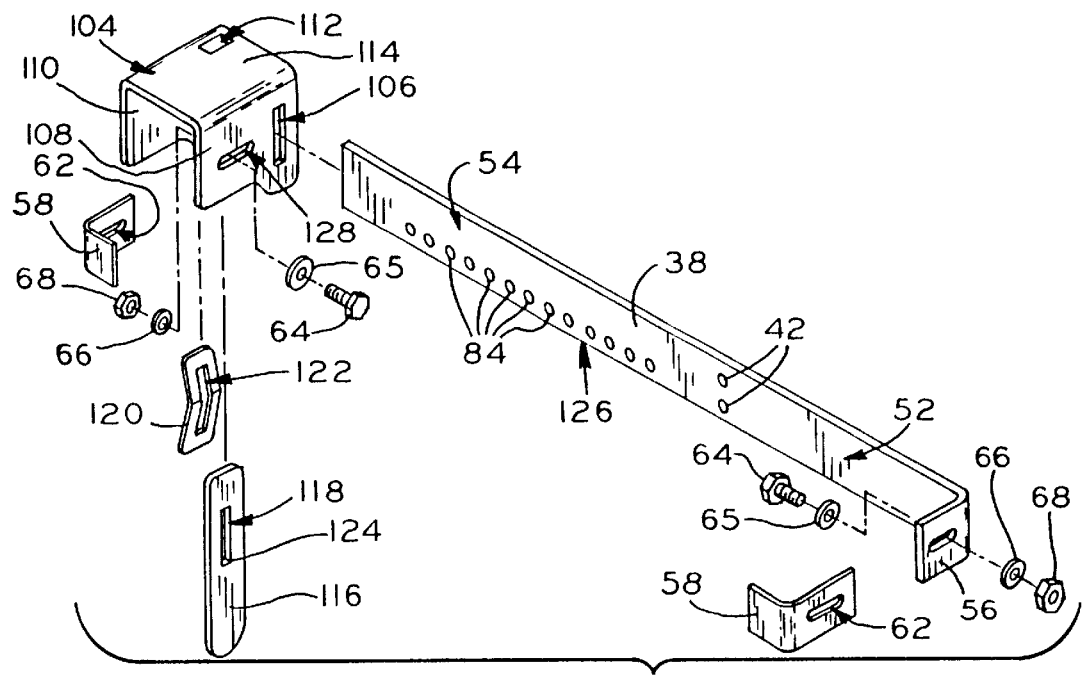
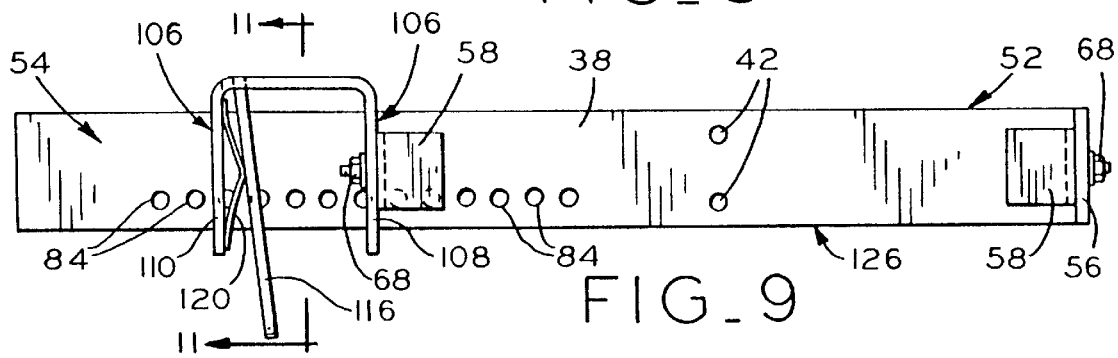
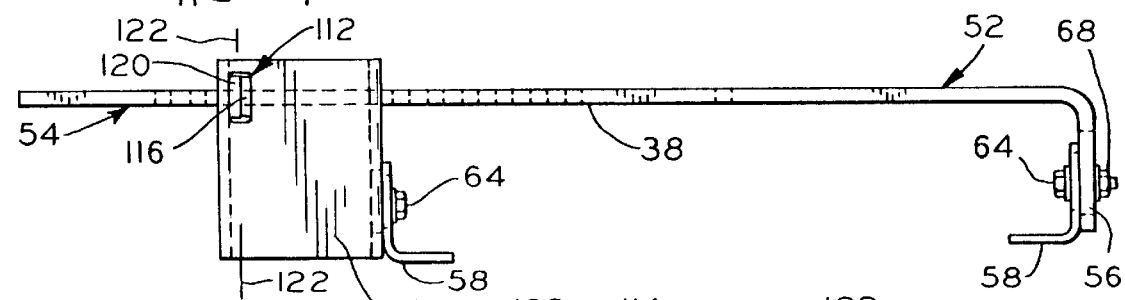
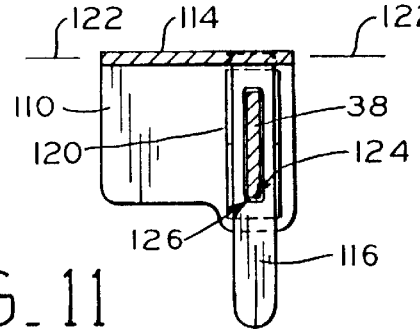

HOLDER FOR BACKPACK TYPE BLOWER

TECHNICAL FIELD

The present invention relates to the technical field of holders or racks for selectively supporting and storing leaf blowers. More particularly, the present invention relates to a blower holder or rack adapted to support and store a backpack type leaf blower.

BACKGROUND OF THE INVENTION

Leaf blowers are today very commonly used by homeowners and professional landscapers for the purpose of blowing and moving leaves, grass clipping and other debris over lawns, sidewalks, driveways, etc. In this manner, the leaves and other debris, for example, can be centralized in piles for more easily gathering and discarding. A versatile and light weight blower typically used for this is commonly generally referred to as a backpack type blower. Backpack blowers generally include an engine and blower adapted to be carried on the user's back and have a flexible air pipe or hose which is carried by one of the user's arms for selectively directing the high velocity stream of air as desired. Because the engine and the blower are carried on the user's back these blowers are less tiring. Typically, the engine and blower are mounted on a padded back plate or frame which rests on the user's back.

In view of their versatility and ease of use, backpack blowers are often used by landscape professionals. As can be appreciated, as landscapers or others use the blowers and move from job to job, they typically store and transport the blowers on their truck or trailer. Blowers which are merely placed on the trailer or truck bed tend to roll around and slide while in transit thereby causing damage to the blowers and other equipment. Further, blowers which are merely placed on the trailer or truck bed and not otherwise secured may be stolen while parked and unattended.

The typical current solution for supporting and storing such blowers is to hang the blower by the frame, back straps or clips/adaptors on a hook attached to the truck or trailer. A tie strap is also selectively placed around the blower and a fixed portion of the truck or trailer so as to prevent the blower from rocking while in transit. A blower holder of this character is, for example, shown and described in U.S. Pat. No. 5,964,358. That patent further discloses a locking mechanism for selectively locking and retaining the blower portions which are placed on the hooks. Although hanging and supporting blowers in this manner in general accomplishes the desired result, tie straps are quite often not used by employees or brake or are placed improperly thus still allowing the blowers to rock and potentially be damaged. The tie straps often still allow movement during transit resulting in damage to the blower. Further, the clips or other adapters required by some models for hanging on a hook get lost or stolen. Additionally, if the blower is hung by the back straps onto a single hook member, this concentrates the strain on the straps thereby damaging or otherwise deforming the blower straps.

Accordingly, a need exists for a backpack blower holder for easily and properly supporting and storing the blower on a trailer or other vehicles and which, further, is readily and easily usable and adaptable for supporting various sizes and types of backpack blowers.

SUMMARY OF THE INVENTION

It is the principal object of the present invention to overcome the above-discussed disadvantages associated with prior blower holding and storing devices and which fulfills the desired above-discussed needs.

The blower holder in accordance with the principles of the present invention, in general, includes a bracket member having first and second ends and which is attached in a horizontal position to a vertical post. The vertical post is attached to a trailer or other vehicle as may be desired. A shelf is also attached to the post vertically below the bracket. In general, the blower is adapted to rest on the shelf while the bracket member locks or otherwise retains the blower thereon. In this regard, a first hook member is provided on the bracket member first end and is adapted to receive one side of the blower back rest plate or frame. A second hook member is provided on the bracket member second end and is adapted to receive the opposite side of the blower back rest plate or frame. The second hook member is selectively movable adjacent the blower back rest plate or frame side for thereby selectively sandwiching the back rest plate or frame between the first and second hook members and thereby effectively retaining and holding the blower over the shelf. A loop member is also provided and is attached to an adjacent vertical post or some other support structure and is adapted to receive and support the blower air pipe.

Preferably, the second hook member is supported by a carrier arm which is itself supported on the bracket second end and is selectively movable for placing the second hook member adjacent the back rest plate or frame. The carrier arm is selectively slidable longitudinally along the bracket second end and is selectively affixed therealong at a position for sandwiching and retaining the back rest plate or frame between the first and second hook members. In one embodiment, the carrier arm is selectively affixed longitudinally along the bracket with a handle threadingly engaging a bolt and which thereby causes frictional engagement between the carrier arm and the bracket. In a second embodiment, the carrier arm is selectively affixed longitudinally along the bracket with a locking bar which is pivotable about a point or axis on the carrier arm and between a locked position wedged against the bracket and an unlocked position generally off of the bracket. In a third embodiment, rather than sliding longitudinally along the bracket, the carrier arm is rotated about an axis of rotation extending through the carrier arm and bracket for thereby selectively placing the second hook member adjacent the blower back rest plate or frame side. Preferably, both the first and second hook members are selectively adjustable for receiving and sandwiching different thickness blower back rest plates and frames.

In one form thereof, the present invention is directed to a blower holder for supporting a backpack type blower having opposing sides. The blower holder includes a bracket member having first and second ends and attachable to a support structure. A first hook member is located on the bracket member first end and is adapted to receive one of the blower opposing sides. A second hook member is provided on the bracket member second end and is adapted to receive the other one of the opposing blower sides. The second hook member is selectively movable adjacent the other one of the opposing blower sides whereby the blower opposing sides are selectively sandwiched between the first and second hook members and the blower is supported on the support structure.

In one form thereof, the present invention is directed to a blower holder for supporting a backpack type blower having opposing sides. The blower holder includes a bracket member having first and second ends and attachable to a support structure. A first hook member is located on the bracket member first end and is adapted to receive one of the blower opposing sides. A second hook member is provided on the bracket member second end and is adapted to receive the other one of the opposing blower sides. A mechanism is provided for selectively moving the second hook member adjacent the other one of the opposing blower sides whereby the blower opposing sides are selectively sandwiched between the first and second hook members and the blower is supported on the support structure.

DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1 is a perspective view of a blower holder constructed in accordance with the principles of the present invention and mounted on a trailer;

FIG. 2 is a perspective view of the blower holder shown in FIG. 1;

FIG. 3 is an exploded perspective view of the blower holder shown in FIG. 2;

FIG. 4 is a perspective view of the bottom of the shelf of the blower holder shown in FIG. 2, FIG. 5 is an exploded perspective view of the loop member of the blower holder shown in FIG. 1;

FIG. 6 is a top plan view of a second embodiment of a blower holder constructed in accordance with the principles of the present invention;

FIG. 7 is a front elevation view of the blower holder shown in FIG. 6;

FIG. 8 is an exploded perspective view of yet another embodiment of a blower holder constructed in accordance with the principles of the present invention;

FIG. 9 is an assembled front elevation view of the blower holder shown in FIG. 8;

FIG. 10 is a top plan view of the blower holder shown in FIG. 8; and,

FIG. 11 is a cross-section view taken generally along line 11—11 of FIG. 9.

Corresponding characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Referring initially to FIG. 1, a blower holder constructed in accordance with the principles of present invention is shown and generally depicted by the numeral 10. Blower holder 10 is adapted to be mounted on a support structure such as vertical support members or posts 12. As shown, vertical posts 12 are preferably attached to the side walls of a trailer 14. Blower holder 10 is adapted to support a backpack type blower 16 which typically includes an engine and blower unit 18 mounted on a padded back rest plate 20. A blower pipe 22 extends out from the engine and blower unit 18. The back rest plate 20 includes sides 24. Back straps 26 are attached to the back rest plate 20 and are used for retaining the blower rest plate 20 and unit 18 on a user's back. It is noted that unit 18 can also be mounted on a frame adapted to rest on a user's back and sides 24 as used and depicted herein are intended to mean and include sides or portions of the back rest plate 20 or any frame which can be received and retained by hook members as more fully described hereinbelow.

The support posts 12 are generally square in cross section and include four longitudinal channels 28. A pair of elongate lips 30 extend over each channel 28. Support posts 12 are preferably made of aluminum by an extrusion process and are cut to length as desired for mounting on a trailer 14 or other vehicle and for supporting a desired number of blowers 16. As best seen in FIGS. 3 and 5, elements 32 having threaded holes 34 are adapted to be longitudinally received within channels 28 and, threaded bolts 36 are threadingly received in holes 34. By threadingly engaging bolts 36 in threaded holes 34 of elements 32, the various components of the blower holder 10 are selectively detachably attachable anywhere along the longitudinal length of the support post 12 and on any one of the four channels 28 thereof. For example, as depicted in FIGS. 2 and 3, the bracket member 38 is attached to the support post 12 with the threaded bolts 36 extending through washers 40 and bracket holes 42 into the longitudinal channel 28 whereat bolts 36 are threadingly received in the treaded holes 34 of element 32. By tightening bolts 36, element 32 is forced toward the lips 30 thereby sandwiching and clamping bracket 38 onto the support member 12.

It is noted that bracket member 38 as well as the other components of the blower or holder 10 are preferably made of steel which has been bent or otherwise shaped as shown. Bracket member 38 is attached to post 12 vertically above shelf 44. As shown in FIG. 1 the blower 16 is adapted to rest on the upper surface 46 of shelf 44. On the lower surface 47 thereof, a brace member 48 is affixed to the shelf 44. Brace member 48 is attached to the lower surface 47 of shelf 44 by welding or other suitable means. Two holes 50 extend through the brace member 48 and are adapted to receive bolts 36. Thus, shelf 44 is secured onto the support post 12 using bolts 36, washers 40 and an element 32 in the same manner as bracket 38 is attached to vertical post 12 as described hereinabove.

The bracket 38, in general, includes a first end 52 and a second end 54. A first hook member 55 is provided on the bracket first end 52 and is preferably made up of a bent portion 56 and ear 58. As shown, the bracket first end 52 is preferably bent so as to form portion 56 extending generally orthogonal thereto. A slot 60 extends into the bent portion 56. Ear 58 is generally L-shaped and includes a slot 62 along one leg thereof. As shown, ear 58 is placed adjacent and is attached to bent portion 56 by extending carriage bolt 64 through slots 60 and 62 and securing thereto with washer 65, lock washer 66 and nut 68. As can be appreciated, by aligning slots 60 and 62, ear 58 can be slid and placed at a desired distance away from three bracket 38. In this manner, as more fully described hereinbelow, the hook member 55 is adjustable for receiving various thickness back rest plates 20 or frames between the ear 58 and bracket 38.

At the bracket second end 54, there is provided a second hook member 67 which is adapted to receive the other side 24 of a frame or back rest plate 20. The second hook member is selectively movable so that the back rest plate 20 or frame can be sandwiched between hook members 55 and 67 with side 24 thereof received within the first and second hook members 55 and 67. More particularly, as shown in FIGS. 2 and 3, hook member 67 includes a carrier arm 70 which is U-shaped and includes a tongue 72. Tongue 72 is T-shaped as shown and is adapted to slidingly be received within slot 74 extending longitudinally along the bracket second end 54. Carrier arm 70 includes a first leg 76 shaped quite similar to bent portion 56 and similarly including a slot 60. An L-shaped ear 58 having a slot 62 is also similarly attached to first leg 76 with a carriage bolt 64, washer 65, lock washer 66 and nut 68. Thus, by aligning the slot 62 of ear 58 with slot 60 of first leg 76, ear 58 is also slidingly adjustable and can be fixed at a desired distance from bracket 38 so as to accommodate various thickness frames or back rest plates 20.

Carrier arm 70 also includes a second leg 78. A hole 80 extends through the second leg 78 and is provided for hanging a padlock (not shown) therefrom when not in use for locking the carrier arm 70 to bracket 38. In this regard, openings 82 are provided on the back plate of carrier arm 70. As carrier arm 70 is slid longitudinally along bracket 38, openings 82 become aligned with any one of the plurality of holes 84 along the bracket second end 54. Openings 82 and holes 84 are sized so as to receive a padlock bail therethrough (not shown) and so as to thereby effectively lock the carrier arm 70 at a desired longitudinal position alone bracket 38.

So as to more rigidly and quickly affix carrier arm 70 to bracket 38, a carriage bolt 86 is provided and extends through square opening 88 of slide dog 90, slot 74 of bracket 38 and a hole 92 extending through the back wall of carrier arm 70. When carriage bolt 86 is received in the square opening 88 of slide dog 90, the carriage bolt 86 is prevented from rotating. Additionally, the slide dog 90 includes a tongue 94 adapted to be received in slot 74 for aiding the slide dog 90 and carriage bolt 86 in longitudinally sliding along slot 74. A handle 96 is also provided and includes a threaded hole 98. After bolt 86 is received through hole 92 of carrier arm 70, it extends through washer 100 and is threadingly received in threaded hole 98 of handle 96. Thus, by rotating handle 96 in the clockwise direction, carrier arm 70 is selectively clamped onto and longitudinally frictionally retained along the bracket second end 54.

As shown in FIGS. 1 and 5, a loop 102 preferably made of steel or plastic i.e., high density polyethylene, and bent to form a short cylinder as shown, is attached to a support post 12 located adjacent the vertical post 12 whereon the blower holder 10 is mounted. Loop 102 includes holes 104 for receiving a bolt 36 therethrough and being mounted to the post 12 vertically therealong at the desired position. As shown in FIG. 1, loop 102 is mounted to the adjacent post 12 at a position generally vertically below the blower holder 10 although it can be mounted anywhere along post 12 and vertically above holder 10 if such assembly is desirable to the user.

In operation, after adjusting ears 58 for the proper thickness of the blower frame or back rest plate 20, handle 96 is rotated counterclockwise loosening the carrier arm 70 and gliding the carrier arm longitudinally away from the first hook member 55, The backpack blower 16 is then placed on shelf 44 with the frame or back rest plate 20 against the bracket 30 and one of the back rest plate sides 24 between the first hook member ear 58 and bracket 38. Carrier arm 70 is then slid longitudinally along the bracket 38 until the other frame or back rest plate side 24 is received between the ear 58 on the carrier arm 70 and bracket 38. In this manner, the frame or back rest plate 20 is sandwiched between the first and second hook members 55 and 67 and is prevented from tilting or falling off of shelf 44. So as to retain the carrier arm 70 in this position, handle 96 is rotated clockwise for frictionally clamping the carrier arm 70 onto the bracket 38 and preventing it from further longitudinal movement. If desired, a padlock (not shown) can be placed through openings 82 of carrier arm 70 and the then aligned hole 84 of bracket 38 thereby effectively locking the carrier arm 70 in that position. Additionally, the blower pipe 22 is placed through the loop 102 as shown in FIG. 1, thereby securing it away from other tools and/or items on the trailer.

In another embodiment shown in FIGS. 8–11, the carrier arm 70 is replaced with a carrier arm 104 which is also U-shaped but which includes vertical slots 106 extending through the first and second legs 108 and 110. Vertical slots 106, as shown, are slightly larger and are aligned with one another so as to receive bracket 38 therethrough. An opening 112 extends through the back plate 114 of carrier arm 104 and is adapted to receive the upper end of locking bar 116. Locking bar 116 also includes a vertical slot 118 slightly larger than and adapted to receive bracket 38 therethrough. For assembly of this embodiment, bracket 38 is first inserted through the vertical slot 106 of first leg 108 and, thereafter, by placing the upper end of locking bar 116 into the opening 112, the vertical slot 118 of the locking bar 116 becomes generally aligned with and the bracket 38 can be extended through the slot 118. Additionally, a flat spring member 120 also having a vertical slot 122 is located between the second leg 110 and the locking bar 116. As shown, after bracket 38 is inserted through vertical slot 118 of locking bar 116, the bracket 38 is received through the vertical slot 122 of flat spring 120 and, finally, through the vertical slot 106 of the second leg 110.

As best shown in FIG. 9, flat spring 110 pushes or biases the locking bar 116 away from second leg 110 and, because the upper part of locking bar 116 is received in opening 112, locking bar 116 is caused to pivot about a point or axis of rotation 122. Spring member 120 causes locking bar 116 to pivot about axis 122 until the lower edge 124 of slot 118 comes in contact with the lower longitudinal edge 126 of bracket 38. As can be appreciated, this wedges or causes sufficient frictional engagement so as to effectively lock the carrier arm 104 at any desired position longitudinally along bracket 38. To move carrier arm 104 therealong, the locking bar 116 is pushed and pivoted toward the second leg 110 against the force of the spring member 120 thereby lifting the lower edge 124 away from the lower longitudinal edge 126. In this manner, the carrier arm 104 and associated second hook member 67 can be slid longitudinally along the bracket 38 for selectively engaging the frame or back rest plate sides 24 and sandwiching the frame or back rest plate 20 between the hook members 55 and 67.

It is noted that in this embodiment, the L-shaped ears SR are attached and are adjustable similar to the embodiment of FIGS. 2 and 3. At the first hook member 55, the ear 58 is similarly attached to the bent portion 56. However, at the second hook member 67, the ear 58 attached to carrier arm 104 using the horizontal slot 128 in first leg 108.

In yet another embodiment as shown in FIGS. 6 and 7, a carrier arm 130 is provided and shaped generally similar to the carrier arm 70. Here, however, bracket 38 is provided with a plurality of holes 130 and the carrier arm 132 includes a single mounting hole 132. Carriage bolt 86 extends through one of the bracket holes 130 and the mounting hole 132 of carrier arm 132. A lock nut 136 is threadingly received on carriage bolt 86 thereby retaining carrier arm 132 against bracket 38 as shown. Carrier arm 132 is thus pivotable about bolt 86 between a locked position as shown in FIG. 6 and an unlocked position as shown in dash lines in FIG. 7.

In this embodiment, the carrier arm 132 is pivotally attached to the bracket second end 54 at a hole 130 whereat, when rotated to the locked position, the blower frame or back rest plate 20 is sandwiched between the hook members 55 and 67. The L-shaped ears 58 are attached and are adjustable in the same fashion as the embodiment of FIGS. 2 and 3 so as to accommodate different thickness frames or back rest plates 20. For preventing carrier arm 132 from inadvertently rotating while in transit and/or preventing theft of the blower, a hole 136 is also provided through the carrier arm 132. Hole 136 aligns with a hole 130 when carrier arm 132 is in the locked position and a padlock bail (not shown) can be inserted through the aligned holes 136 and 130 to prevent further rotation of the carrier arm 132.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A holder for supporting a backpack blower having opposing sides, said blower holder comprising:
   a bracket member having first and second ends and attachable to a support structure;
   a first hook member on said bracket member first end adapted to receive one of the blower opposing sides;
   a second hook member on said bracket member second end adapted to receive the other one of said opposing blower sides; and,
   wherein said second hook member is selectively movable adjacent said other one of said opposing blower sides whereby the blower opposing sides are selectively sandwiched between said first and second hook members and the blower is supported on the support structure.

2. The blower holder of claim 1 further comprising a shelf attachable to the support structure vertically below said bracket whereupon the blower may rest.

3. The blower holder of claim 2 wherein the support structure comprises an elongate vertical post and including means for selectively attaching said bracket and shelf vertically along said post.

4. The blower holder of claim 2 further comprising a loop member adapted to receive and support a blower air pipe.

5. The blower holder of claim 1 wherein said first and second hook members are selectively adjustable for receiving different thickness blower sides.

6. The blower holder of claim 1 further comprising a loop member adapted to receive and support a blower air pipe.

7. The blower holder of claim 6 further comprising an elongate vertical post whereon said loop is attachable and means for attaching said loop vertically along said post.

8. The blower holder of claim 1 wherein said second hook member is on a carrier arm supported on said bracket second end, said carrier arm being selectively movable for selectively placing said second hook member adjacent said other one of said opposing blower sides.

9. The blower holder of claim 8 further comprising means for selectively sliding said carrier arm longitudinally along said bracket second end.

10. The blower holder of claim 9 further comprising means for selectively affixing said carrier arm along said bracket second end.

11. The blower holder of claim 10 wherein said means for selectively affixing comprises a threaded bolt extending through aligned openings in said bracket and carrier arm and a handle threadingly engaging said bolt, whereby rotation of said handle causes frictional engagement between said carrier arm and bracket.

12. The blower holder of claim 10 wherein said means for selectively affixing comprises a locking bar pivotable about a point on said carrier arm and between a locked position against said bracket and an unlocked position generally off of said bracket, and a spring for biasing said locking bar toward said locked position.

13. The blower holder of claim 10 further comprising a shelf attachable to the support structure vertically below said bracket whereupon the blower may rest.

14. The blower holder of claim 10 further comprising a loop member adapted to receive and support a blower air pipe.

15. The blower holder of claim 10 wherein said first and second hook members are selectively adjustable for receiving different thickness blower sides.

16. The blower holder of claim 8 further comprising means for rotating said carrier arm and thereby selectively placing said second hook member adjacent said other one of said opposing blowing sides.

17. The blower holder of claim 8 further comprising a shelf attachable to the support structure vertically below said bracket whereupon the blower may rest.

18. The blower holder of claim 8 further comprising a loop member adapted to receive and support a blower air pipe.

19. The blower holder of claim 8 wherein said first and second hook members are selectively adjustable for receiving different thickness blower sides.

20. A holder for supporting a backpack blower having opposing sides, said blower holder comprising:
    a bracket member having first and second ends and attachable to a support structure;
    a first hook member on said bracket member first end adapted to receive one of the blower opposing sides;
    a second hook member on said bracket member second end adapted to receive the other one of said opposing sides; and,
    means for selectively moving said second hook member adjacent said other one of said opposing blower sides whereby the blower opposing sides are selectively sandwiched between said first and second hook members and the blower is supported on the support structure.

21. The blower holder of claim 20 further comprising a shelf attachable to the support structure vertically below said bracket whereupon the blower may rest.

22. The blower holder of claim 20 wherein said first and second hook members are selectively adjustable for receiving different thickness blower sides.

23. The blower holder of claim 20 further comprising a loop member adapted to receive and support a blower air pipe.

24. The blower holder of claim 20 further comprising means for selectively affixing said second hook member along said bracket second end.

25. The blower holder of claim 24 further comprising a shelf attachable to the support structure vertically below said bracket whereupon the blower may rest.

26. The blower holder of claim 24 wherein said first and second hook members are selectively adjustable for receiving different thickness blower sides.

27. The blower holder of claim 24 further comprising a loop member adapted to receive and support a blower air pipe.

* * * * *

UNITED STATES PATENT AND TRADEMARK OFFICE
CERTIFICATE OF CORRECTION

PATENT NO. : 6,302,280 B1
DATED : October 16, 2001
INVENTOR(S) : Steven P. Bermes It is certified that error appears in the above-identified patent and that said Letters Patent is hereby corrected as shown below:

Column 4,
Line 56, delete "three" and insert -- the --.

Column 5,
Line 56, delete "gliding" and insert -- sliding --.

Column 6,
Line 50, delete "SR" and insert -- 58 --.

Column 7,
After line 23, insert -- a supporting member for supporting at least a portion of the backpack blower --
Line 38, delete "further comprising" and insert -- wherein said supporting member is --.

Column 8,
After line 31, insert -- a supporting member for supporting at least a portion of the backpack blower --
Line 9, delete "further comprising" and insert -- wherein said supporting member is --.
Line 22, delete "further comprising" and insert -- wherein said supporting member is --.
Line 45, delete "further comprising" and insert -- wherein said supporting member is --.
Line 57, delete "further comprising" and insert -- wherein said supporting member is --.

Signed and Sealed this

Eleventh Day of June, 2002

*Attest:*

JAMES E. ROGAN
*Attesting Officer*  *Director of the United States Patent and Trademark Office*